US010407957B1

(12) United States Patent
Camp et al.

(10) Patent No.: US 10,407,957 B1
(45) Date of Patent: Sep. 10, 2019

(54) MULTI-STATE CLUTCH ASSEMBLY

(71) Applicant: Apple Inc., Cupertino, CA (US)

(72) Inventors: John S. Camp, San Francisco, CA (US); Robert L. Coish, Mountain View, CA (US); John A. Porcella, Campbell, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 15/691,220

(22) Filed: Aug. 30, 2017

(51) Int. Cl.
*E05D 3/02* (2006.01)
*F16D 7/02* (2006.01)
*G06F 1/16* (2006.01)
*E05D 11/00* (2006.01)
*E05D 11/08* (2006.01)
*F16D 13/16* (2006.01)
(Continued)

(52) U.S. Cl.
CPC ............. *E05D 11/082* (2013.01); *E05D 3/02* (2013.01); *E05D 11/00* (2013.01); *F16D 7/021* (2013.01); *F16D 13/16* (2013.01); *F16D 13/62* (2013.01); *F16D 13/752* (2013.01); *F16D 27/14* (2013.01); *G06F 1/1681* (2013.01); *E05Y 2900/606* (2013.01)

(58) Field of Classification Search
CPC .... G06F 1/1681; G06F 1/1616; G06F 1/1677; G06F 1/1679; H02J 50/10; H02J 50/12; H02B 5/0075; H02B 5/0081; H02B 5/0087; H02B 5/0093; H01F 38/14; F16D 7/02; F16D 7/021; F16D 7/022; F16D 13/025; F16D 13/10; F16D 13/12; F16D 13/14; F16D 13/16; F16D 13/28; F16D 13/752; F16D 23/12; F16D 27/14; F16D 2027/002; F16D 2027/004; F16D 2027/001; F16D 28/00; F16D 49/02; F16D 49/08; F16D 63/002
See application file for complete search history.

(56) References Cited

U.S. PATENT DOCUMENTS 7,027,294 B2  4/2006  Kato
7,996,958 B2  8/2011  Tang
(Continued)

FOREIGN PATENT DOCUMENTS

WO        2002080386 A1    10/2002

*Primary Examiner* — Jacob S. Scott
*Assistant Examiner* — James J Taylor, II
(74) *Attorney, Agent, or Firm* — Dickinson Wright RLLP

(57) ABSTRACT

Clutch assemblies that can provide variable break-away torques are described. An exemplary multi-state clutch assembly can include a shaft, a first frictional element frictionally engaged with the shaft and a second frictional element that can provide variable friction. When the second frictional element provides a low friction, second frictional element can be rotatable relative to the first frictional element, which can remain stationary relative to the shaft. When the second frictional element provides a high friction, it can be secured to the first frictional element. Hence, the first and second frictional elements can be locked together and be rotatable relative to the shaft. Tightening or loosening the second frictional element can vary the overall break-away torque provided by the clutch assembly. The multi-state clutch assembly can be in communication with a sensor or a switch that can respond to a user to change the friction of the clutch assembly.

20 Claims, 10 Drawing Sheets

(51) Int. Cl.
    *F16D 13/62*       (2006.01)
    *F16D 13/75*       (2006.01)
    *F16D 27/14*       (2006.01)

(56) References Cited

U.S. PATENT DOCUMENTS

| | | | |
|---|---|---|---|
| 9,805,864 B2 * | 10/2017 | Kasar | H01F 38/14 |
| 2005/0046374 A1 | 3/2005 | Ogawa et al. | |
| 2014/0098474 A1 | 4/2014 | Bhowmik et al. | |
| 2015/0342067 A1 * | 11/2015 | Gault | H05K 5/0226 |
| | | | 248/357 |
| 2015/0362962 A1 * | 12/2015 | Lee | G06F 1/1601 |
| | | | 361/679.21 |
| 2018/0052496 A1 * | 2/2018 | Tucker | G06F 1/1643 |

* cited by examiner

MULTI-STATE CLUTCH ASSEMBLY

FIELD

The described embodiments relate to clutch assemblies that can be used in electronic devices. More particularly, the described embodiments relate to clutch assemblies that can have variable torque. Even more particularly, the described clutch assemblies can have more than one frictional element.

BACKGROUND

Electronic devices can have different portions that are movable relative to each other to form different configurations of the electronic device. For example, a laptop computer can have a closed configuration in which the laptop computer is folded and an open configuration in which a lid portion is at an inclination angle relative to the base portion. To enable the movement among different portions, clutch assemblies are often employed to pivotally couple one portion of an electronic device to another. Since clutch assemblies are commonly used in associated with electronic devices, it is desirable to continue to improve the quality of clutch assemblies to provide the best user feeling and experience.

SUMMARY

This paper describes various clutch assemblies suited for use in electronic devices to pivotally couple a first portion of an electronic device to a second portion.

According to one embodiment, a clutch assembly that can pivotally couple a first portion of an electronic device to a second portion of the electronic device is described. The clutch assembly can include a rotatable component that can rotate about a rotational axis. The clutch assembly can also include an actuator that can receive an input signal and provide a corresponding mechanical action. The clutch assembly can further include a torque generating system engaged with the rotatable component. The torque generating system can include a first torque component in direct physical contact with the rotatable component and can provide a first break-away torque having a fixed value. The torque generating system can also include a second torque component in communication with the actuator. The second torque component can provide a second break-away torque having a variable value that varies in accordance with the corresponding mechanical action. The overall break-away torque can be (i) the variable value when the variable value is less than the fixed value, otherwise, (ii) the fixed value.

According to another embodiment, a clutch assembly that can pivotally couple a first portion of an electronic device to a second portion of the electronic device is described. The clutch assembly can include a shaft and a first torque component rotationally engaged with the shaft. The first torque component can have a hollow body characterized as having an exterior surface and an interior surface. The interior surface can be frictionally engaged the shaft. The first torque component can provide a first break-away torque having a fixed value. The clutch assembly can also include a second torque component that is adjustable. The second torque component can provide a second break-away torque having a variable value. In an engaged state of the second torque component, the second torque component is frictionally engaged with the exterior surface of the first torque component such that the variable value is greater than the fixed value. The second torque component can also be operable in a disengaged state in which the variable value is less than the fixed value.

According to yet another embodiment, a method for a clutch assembly that pivotally couple a lid portion to a base portion of a laptop computer is described. The lid portion can have a sensor that can send a detection signal to the actuator. The clutch assembly can include a shaft, a clamp frictionally engaged with the shaft, a connector being wound around the clamp, and an actuator that can extend or retract the connector. The wire can be frictionally engaged with the clamp in a retracted state. The method can include, in response to a first detection signal of the sensor associated with a first detection state, extending the connector. The method can also include, in response to a second detection signal of the sensor associated with a second detection state, retracting the connector. When the connector is retracted, a break-away torque value between the connector and the clamp can be higher than a break-away torque value between the clamp and the shaft.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
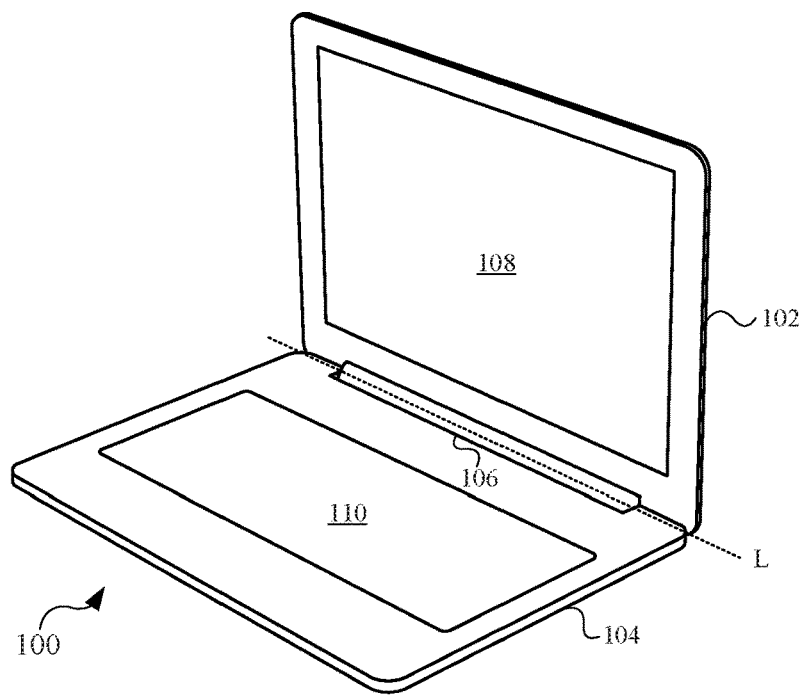
FIG. 1A is a perspective view of an electronic device in an open configuration in accordance with some embodiments.

Those skilled in the art will appreciate and understand that, according to common practice, various features of the drawings discussed below are not necessarily drawn to scale, and that dimensions of various features and elements of the drawings can be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; other embodiments may be used, and changes may be made without departing from the spirit and scope of the described embodiments.

The described embodiments relate to a multi-state clutch assembly. The multi-state clutch assembly can be used to customize the kinematics of a mechanical system in accordance with desired design considerations. In one embodiment, the multi-state clutch assembly can provide a torque having a torque value that can be altered in accordance with a state of a system in order to provide an aesthetically pleasing tactile experience. Generally speaking, the multi-state clutch assembly can have a shaft that defines an axis of rotation about which the first portion of a system can move with respect to the second portion of the system. When the design requires that the first portion retain a fixed position, or angular displacement, relative to the second portion in an open configuration, the multi-state clutch assembly can provide a torque that can counter a torque generated by the weight of the first portion in the open configuration. The torque generated by the first portion can be related to a relative position of the first portion to the second portion being within a range of angular displacement. A torque generating component can take the form of frictional element that engages the shaft with frictional force applied at a surface of the shaft.

For example, a class of personal electronic devices known as laptop computers generally includes a base portion that provides various input devices such as a keyboard or a touch pad. The base portion can be pivotally coupled to a lid portion by way of a multi-state clutch assembly. Generally speaking, the lid portion can include an output device (such as a display, speakers etc.) for presenting relevant content. In an open configuration, the base portion and the lid portion are positioned away from each other such that the input devices and output devices are readily accessible. On the other hand, in a closed configuration, the base portion and the lid portion are positioned in proximity to each other such that the input devices and output devices are generally inaccessible. The closed configuration is well suited for situations where the laptop computer is not in use or is in use but without the need for having the input and output devices being accessible. Accordingly, in order to customize the kinematic response of the laptop computer, the multi-state clutch assembly can provide a torque to the lid portion commensurate with an anticipated change of configuration, i.e., from closed configuration to open configuration, and vice versa. In the case with the laptop computer is anticipated to undergo a change of configuration from closed to open, it would be advantageous to provide little or no resistance to movement of the lid from one position to another position. However, once the lid portion has reached a final position relative to the base portion, it is desirable for the lid portion to remain at the final position. At this point, the multi-state clutch assembly can provide a torque having a value of sufficient magnitude to offset a counter-torque associated with the weight of the lid portion. In this way, the lid portion can exist in a state of static equilibrium.

More specifically, in accordance with an embodiment, the detection of a change of configuration of the electronic device can be achieved by using one or more sensors. The sensors can include a proximity sensor capable of detecting a presence of, for example, a finger or other appendage without actually requiring a touch. For instance, a proximity sensor in the form of a temperature sensor can detect body heat. A sensor in the form of an ultrasonic sensor can use high frequency sound to detect an approaching or receding object. Other sensors can include optical sensors, image sensors, or touch sensors that can rely on various technologies (such as resistive, capacitive, etc.) to detect a change event. Those sensors can be located at appropriate locations of the electronic devices. Those locations can be certain likely locations at which a detectable event may occur to indicate that reconfiguration of the electronic device is imminent. For example, the locations can be near and/or along the perimeter of one portion of the electronic device.

The sensors can have various detection states, one of which can be associated with the detection of an event corresponding to a change in a configuration of the system (e.g. detection of a presence of a finger in the proximity of the sensor). Corresponding to a first detection state (i.e. a change event is detected), the multi-state clutch assembly can provide a first torque associated with moving (such as rotational movement) one part relative to another. In this situation, minimal resistance to movement can be provided as the torque has a low torque value that can be overcome with little applied force so that the electronic device can be reconfigured easily. In one case, the first torque can be small as to approximate a null torque, meaning that the multi-state clutch assembly provides little to no resistance against rotational movement when the sensor detects an appropriate event. Otherwise, in a default state indicating a static, or no change, situation, the multi-state clutch can provide a second torque that can maintain the static equilibrium of the mechanical system.

In terms of the structure, in one embodiment, an exemplary multi-state clutch assembly can include a shaft, a first frictional element frictionally engaged with the shaft, and a second frictional element engaged with the first frictional element. The second frictional element can be adjustable. The frictional elements can be torque components and can take the form of clutches, cams, clips, wedges, winding wires, and other suitable components that can provide friction between two movable parts. The shaft can be connected to a first portion of an electronic device while the second frictional element can be connected to a second portion of the electronic device. Hence, the relative rotation between the shaft and the second frictional element can correspond to the rotational movement between the first and second portions of the electronic device. In one embodiment, the first frictional element can take the form of a C-shaped clamp having a cylindrical body with an interior surface and an exterior surface. In one case, the interior surface of the first frictional element can be frictionally engaged with the shaft with a constant break-away torque between the first frictional element and the shaft. A clutch can provide a variable torque in opposition to applied torques up to a break-away limit. In other words, a break-away torque (or break-away torque limit) is the maximum torque value that a clutch can provide against externally applied torques before slipping.

The second frictional element can be a connector such as a wire that wraps around the exterior surface of the first frictional element. Due to the exponential relationship between the torque provided by the second frictional element and the tension applied to the wire, assuming that the wire is essentially inelastic, a small change in tension in the wire can result in a large change in the torque provided by the second frictional element. Moreover, by arranging the wire in such a way that the length of the wire can be changed incrementally, the second frictional element can be adjustable at least between a locked state and an unlocked state. In the locked state, the second frictional element can exert high friction on the exterior surface of the first frictional element. In such state, the friction (and thereby the resulting torque) between the surface of the first frictional element and second frictional element can be significantly larger than the friction between the first frictional element and the shaft. Hence, as a result of an applied force turning the multi-state clutch assembly, the first and second frictional elements can essentially be locked relative to each other and can rotate together relative to the shaft. As such, the minimum applied torque required to turn the multi-state clutch can depend on the break-away torque between the first frictional element and the shaft. On the other hand, in the unlocked state, the second frictional element, in the form of the wire, can at least partially disengage from the first frictional element by incrementally changing the length of the wire so that the friction between the surface of the first frictional element and second frictional elements is significantly reduced. In one case, the second frictional element can fully disengage from the first frictional element so that the friction between the first and second frictional elements becomes zero. In such an unlocked state, the second frictional element can be freely rotatable relative to the first frictional element while the friction between the first frictional element and the shaft holds the first frictional element and the shaft together. By engaging or disengaging the second frictional element, the overall break-away torque of the multi-state clutch can be adjusted.

The engagement or disengagement of the second frictional element from the first frictional element can be controlled by different possible structures that are associated with or are part of the second frictional element. In one exemplary embodiment, the second frictional element, in the form of a wire, can be connected to an actuator that can cause the wire to transition to the locked state in one embodiment. The actuator can include an electrical component in communication with the aforementioned sensor. In this way, the actuator can, based on the detection state of the sensor, provide a mechanical action that can take the form of, for example, a force exerted on the wire. For instance, in one embodiment, the actuator can include a spring element connected to the wire. The spring element can exert a spring force on the wire, causing the wire to tighten around the surface of the first frictional element by incrementally reducing a length of the wire in accordance with the locked state. Based upon a detection state of the sensor, the actuator can exert a counter force that overcomes the spring force of the spring element and, in turn, loosens the wire by unwinding (or lengthening) the wire about the external surface of the first frictional element. The loosened state of the wire can be the unlocked state of the second frictional element. Hence, the engagement and disengagement of the second frictional element can be achieved by tightening (reducing length) or loosening (increasing length) the wire using the actuator based on the detection states of the sensor. It should be noted that other structures and/or mechanisms are also possible for controlling the engagement of the second frictional element with the first frictional element.

These and other embodiments are discussed below with reference to FIGS. 1A-10; however, those skilled in the art will readily appreciate that the detailed description given herein with respect to these figures is for explanatory purposes only and should not be construed as limiting.

Figure 1B:
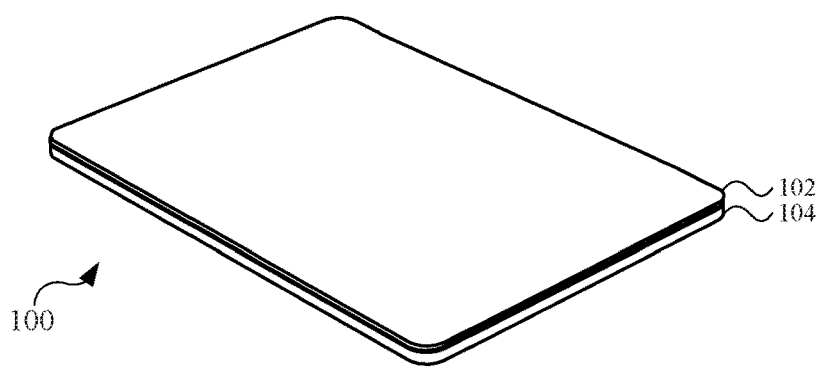
FIG. 1B is a perspective view of the electronic device shown in FIG. 1A in a closed configuration.
Figure 1C:
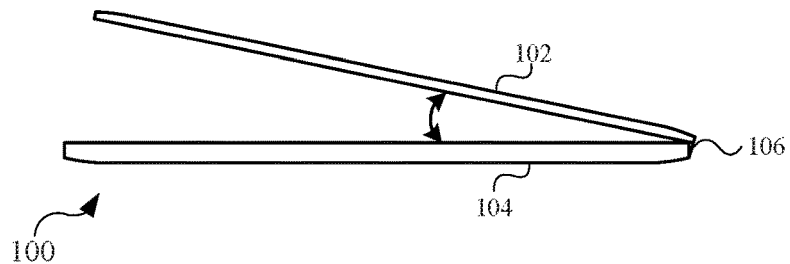
FIG. 1C is a side view of the electronic device shown in FIG. 1A.

Referring to FIGS. 1A-1C, an electronic device 100 in different configurations according to some embodiments is illustrated. Electronic device 100 can include a first portion 102 and a second portion 104. For example, first portion 102 can be a lid portion while second portion 104 can be a base portion, or vice versa. FIG. 1A illustrates electronic device 100 in an open configuration; FIG. 1B illustrates electronic device 100 in a closed configuration; FIG. 1C illustrates a side view of electronic device 100. First portion 102 can be pivotally coupled to second portion 104 via a multi-state clutch assembly 106 about a rotational axis L that is along multi-state clutch assembly 106. The relative angle between first portion 102 and second portion 104 can be adjusted so that electronic device 100 can be reconfigured at least between an open configuration and a closed configuration.

Electronic device 100 described herein can be any suitable type of electronic device. For example, in one embodiment, electronic device 100 can take the form of a laptop computer. In such embodiment, first portion 102 can be a lid portion and can carry a display assembly 108. Second portion 104 can be a base portion that can house different internal electronic components (not shown) including processors, memories, integrated circuits, batteries, and/or other suitable operating components. On a surface, second portion 104 can carry one or more input devices 110 such as a keyboard, a keypad, and/or a trackpad.

In another embodiment, electronic device 100 can take the form of a tablet device. In such embodiment, first portion 102 can be the tablet device that carries a display assembly 108 that can have a touch screen capability. Second portion 104 can be an accessory article that can be removably or fixedly coupled to the tablet device. The accessory article can be brought in front of a front surface of the tablet device to protect display assembly 108, as shown in FIG. 1B. The accessory article can also be brought behind the tablet device so that display assembly 108 is accessible for users. The movement of the accessory article relative to the tablet device can be achieved using multi-state clutch assembly 106.

An open configuration of electronic device 100 can often be associated with an active state of electronic device 100 because display assembly 108 is often visible and/or accessible in the open configuration. In some situations, it can be desirable to maintain electronic device 100 in an open configuration. For example, in FIG. 1A, first portion 102 is at an upright or inclined position with respect to second portion 104. Second portion 104 can be placed on a horizontal surface (e.g. a table) so that the inclined first portion 102 can provide a desirable view angle of display assembly 108 for the users. In such configuration, it can be desirable for first portion 102 to remain stationary relative to second portion 104 without any additional support, such as without a user manually holding first portion 102. Hence, multi-state clutch assembly 106 can provide a torque that can counter the torque generated by the weight of first portion 102 so that first portion 102 does not naturally fall back to second portion 104. On the other hand, when a user intends to change the configuration of electronic device 100, such as from an open configuration to a closed configuration, or vice versa, multi-state clutch assembly 106 can provide a reduced break-away torque or zero break-away torque so that the torque can easily be overcome. The detail mechanisms of the change of break-away torques of different exemplary clutch assemblies will be discussed in detail below.

Figure 2:
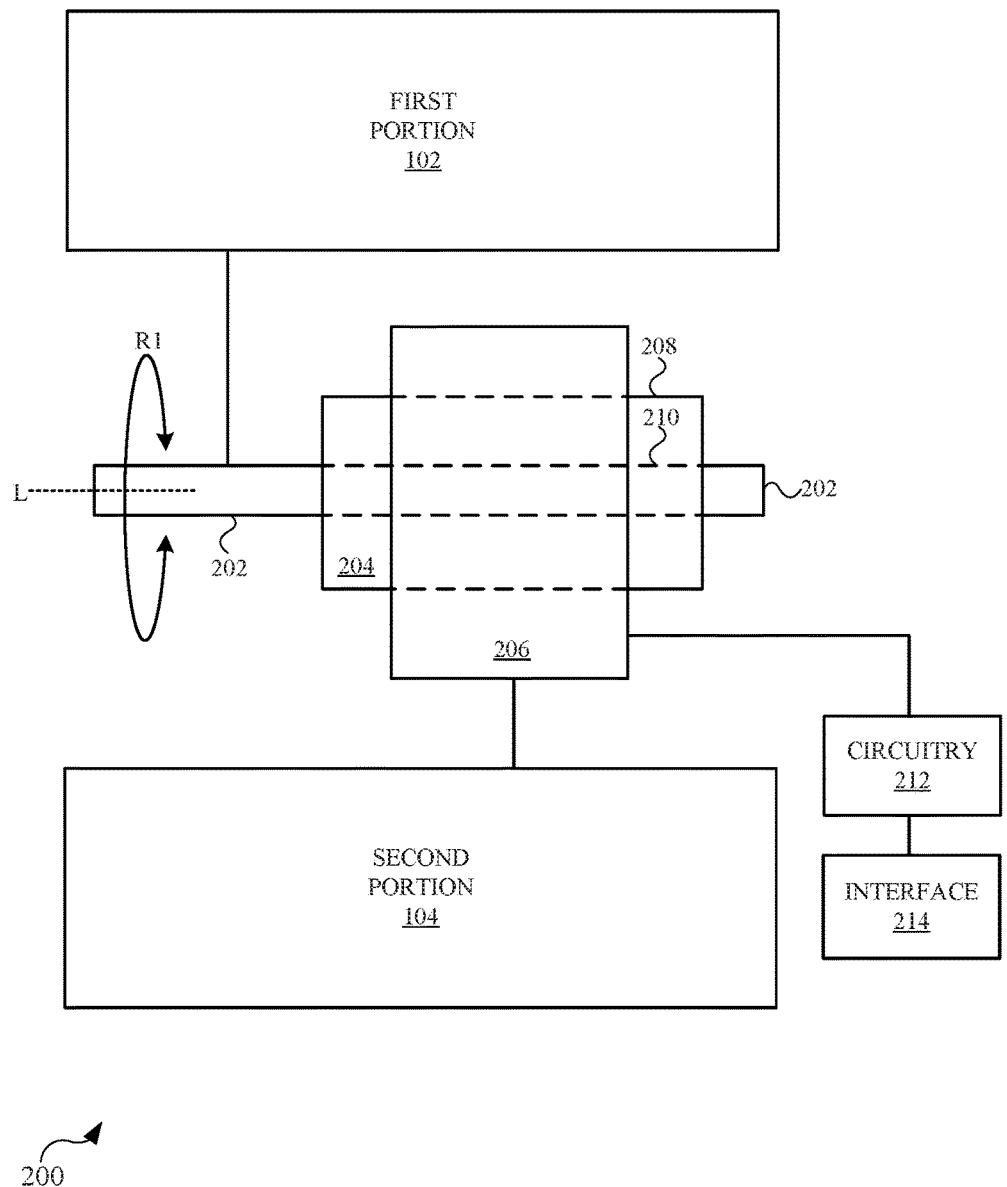
FIG. 2 is a schematic box diagram illustrating a multi-state clutch assembly in accordance with some embodiments.
Figure 3:
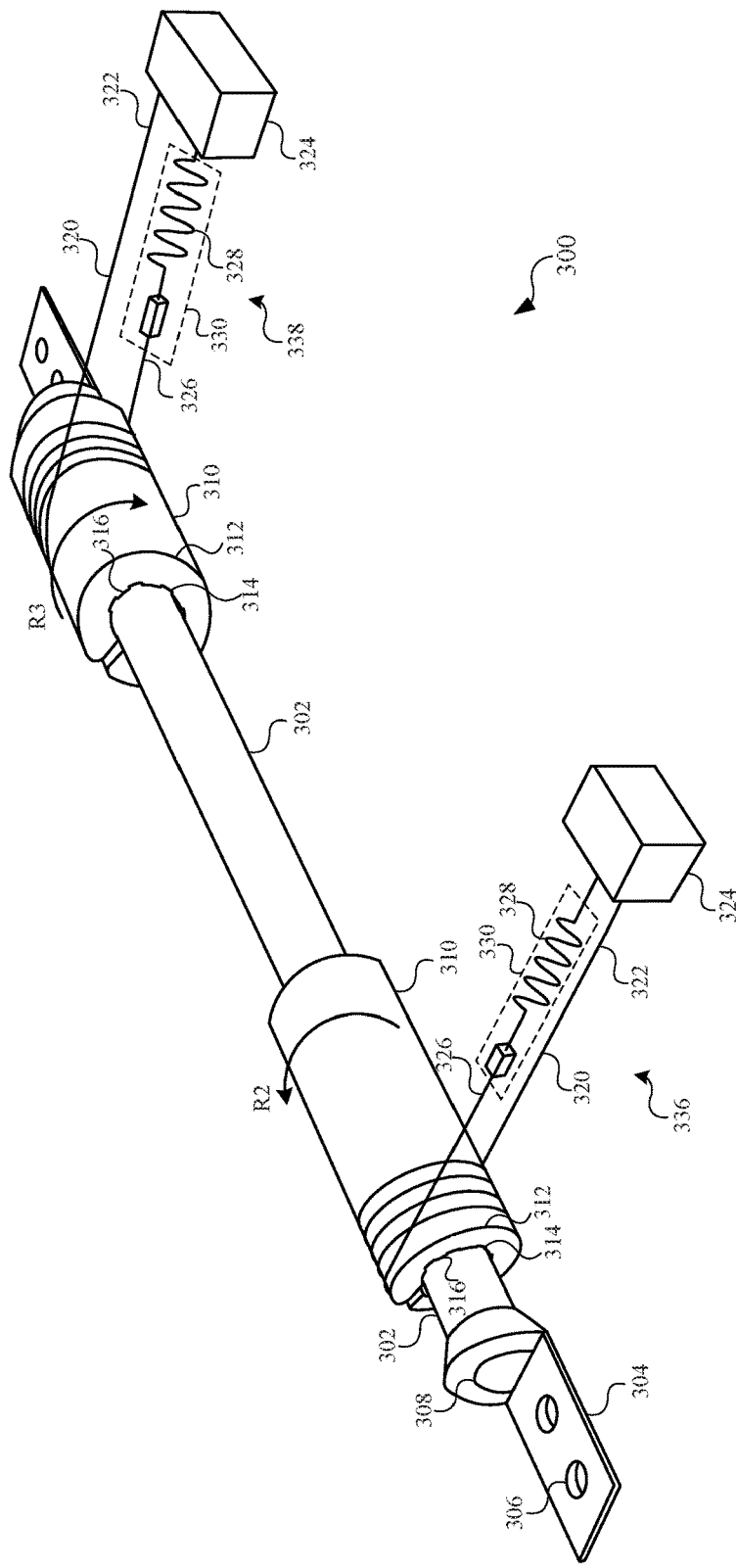
FIG. 3 is a perspective view of an exemplary multi-state clutch assembly in accordance with some embodiments.

FIG. 2 illustrates a schematic box diagram for a multi-state clutch assembly 200 that can have variable break-away torque limits in accordance with some embodiments. Multi-state clutch assembly 200 can also simply be referred to as a clutch assembly or a hinge assembly. Multi-state clutch assembly 200 can be used as multi-state clutch assembly 106 for electronic device 100. It should be noted that the components, their exact arrangements and connections can take various different forms and should not be limited by the shapes and arrangements illustrated in the schematic box diagrams. For example, while certain frictional elements are illustrated as rectangles, the exact shapes and forms of those elements are not limited in such a manner. For example, in one embodiment a second frictional element can take the form of a wire wrapped around on a surface. However, for illustration purposes, the frictional elements are shown as rectangular boxes in FIG. 2.

Multi-state clutch assembly 200 can include a rotatable component and a torque generating system. The rotatable component can take the form of a shaft 202. The torque generating system can include a first frictional element 204 and a second frictional element 206. Multi-state clutch assembly 200 can be a torque system that generates a torque having an adjustable value through the frictional elements 204 and 206 when the torque generating system engaged with shaft 202. Hence, the first frictional element 204 can be referred to as a first torque component and the second frictional element 206 can be referred to as a second torque component.

Shaft 202 can be an axial element that is capable of rotation relative to the frictional elements 204 and 206 about the rotational axis L, as illustrated by arrow R1 in FIG. 2. Shaft 202 is illustrated as an elongated rectangle in FIG. 2 with part of the rectangle shown in dashed line because a portion of shaft 202 can be enclosed by the frictional elements 204 and/or 206.

Frictional elements 204 and 206 can take various forms, including but not limited to, clutches, cams, clamps, clip, wedges, winding wires, and/or any other suitable mechanical engagement structures or mechanisms. Frictional elements 204 and 206 can be of the same types or can be of different types. For instances, in one case frictional elements 204 and 206 can both be clutches that take the form of C-shaped clamps. In another case, first frictional element 204 can be a clutch while second frictional element 206 can be a wire (even though it is shown as a rectangular box in FIG. 2) wrapped on the exterior surface of first frictional element 204. The wire provides friction based on how tight the wire wraps around and in direct contact with the exterior surface of first frictional element 204. The tightness of the wire can be the length of the wire in physical communication with the surface of first frictional element. In yet another case, first frictional element 204 can be a clutch while second frictional element 206 can be a wedge that can stop certain movement directions of first frictional element 204 relative to second frictional element 206.

In some embodiments, first frictional element 204 can have a body that can be hollow along the rotational axis L. The hollow body of first frictional element 204 can include an exterior surface 208 and an interior surface 210. First frictional element 204 can be rotationally engaged with shaft 202. At least a portion interior surface 210 of first frictional element 204 is in contact with shaft 202. Hence, interior surface 210 can be in direct physical contact and be frictionally engaged with shaft 202. Due to the surface contact between interior surface 210 and shaft 202 that generates friction, an applied torque must overcome the frictional torque to turn shaft 202 relative to first frictional element 204. It should be noted that there could be various surface features (e.g. protrusions, teeth, rough surfaces, etc.) on interior surface 210 and/or on the surface of shaft 202. Those features can provide friction between shaft 202 and first frictional element 204. By changing the size, shape, and design of the features, the exact friction can be adjusted and determined. While those features are not shown in the illustrative schematic box diagram in FIG. 2, some of those exemplary features will be shown in later figures. It should also be noted that first frictional element 204 can be an unchanged frictional element and can have a stiff body. Hence, in one embodiment, first frictional element 204 can be a constant frictional element that can provide a break-away torque between first frictional element 204 and shaft 202 that has a fixed value at an angular displacement between the first frictional element 204 and shaft 202.

On the contrary, second frictional element 206 can be an adjustable frictional element based on different circumstances of electronic device 100. The detailed circumstances that can change the configuration of second frictional element 206 will be discussed below. Second frictional element 206 can be positioned on or near the exterior surface 208 of first frictional element 204. Second frictional element 206 can be adjusted or altered between a high friction state and a low friction state. In the high friction state, second frictional element 206 can be in contact with exterior surface 208 of first frictional element 204 and be frictionally engaged with exterior surface 208. In the low friction state, second frictional element 206 may still frictionally engaged with first frictional element 204, but the friction between the two frictional elements is reduced compared to the high friction state. However, in some cases the friction between the two frictional elements can be zero in the low friction state, meaning second frictional element 206 can fully disengage from first frictional element 204. The high friction state can sometimes be referred to as an engaged state, a tightened state, and/or a locked state while the low friction state can sometimes be referred to as disengaged state, a loosened state, and/or an unlocked state.

Shaft 202 can be physically connected and secured to first portion 102 of electronic device 100 while second frictional element 206 can be physically connected and secured to second portion 104 of electronic device 100, or vice versa. Hence, a relative rotation between shaft 202 and second frictional element 206 can correspond to the rotational movement between first and second portions 102 and 104 of electronic device 100. First frictional element 204 can be positioned between shaft 202 and second frictional element 206. In one case, first frictional element 204 is connected neither to first portion 102 nor to second portion 104. As it will be discussed in detail below, first frictional element 204 can either rotate with shaft 202 or rotate with second frictional element 206, depending on the friction state of second frictional element 206. Second frictional element 206 can be connected to and/or in communication with circuitry 212, which can control the alternation of second frictional element 206 between the high friction state and the low friction state. Circuitry 212 can be in communication with interface 214, which can interact with a user or an external medium. Circuitry 212 and interface 214 can together or separately be carried by first portion 102 and/or second portion 104.

Because of the presence of two frictional elements, two break-away torque limits can exist in multi-state clutch assembly 200. A constant first break-away torque can exist between shaft 202 and first frictional element 204 at an angular displacement. A variable second break-away torque can exist between first frictional element 204 and second frictional element 206. For multi-state clutch assembly 200 as a whole, the overall break-away torque provided by multi-state clutch assembly 200 can have a value that corresponds to the lower of the first break-away torque value and the second break-away torque value. It is because the multi-state clutch assembly 200 can begin to rotate once an applied force overcomes the lower of the two break-away limits. By changing the friction state of second frictional element 206, the overall break-away limit of the multi-state clutch assembly 200 can be adjusted.

In a high friction state, the second frictional element 206 can be locked with the first frictional element 204. The friction between first and second frictional elements 204 and 206 can be significantly higher than the friction between first frictional element 204 and shaft 202. Hence, when sufficient torque is applied to turn the multi-state clutch assembly 200, second frictional element 206 can remain stationary with first frictional element 204 due to the high friction between the frictional elements. In such case, first frictional element 204, along with second frictional element 206, can rotate relative to shaft 202. Therefore, when first portion 102 rotates relative to second portion 104, the first break-away torque governs the overall break-away torque of multi-state clutch assembly 200.

In a low friction state, second frictional element 206 can be fully disengaged (or almost fully disengaged) from first frictional element 204. Since there is low or no resistance between first and second frictional elements 204 and 206, second frictional element 206 can freely rotate relative to first frictional element 204. As a result, second friction element 206 is no longer able to generate any torque. Hence, the second break-away torque can have a null value. Comparatively, the first break-away torque (which remain constant) now has a high value, so first frictional element 204 will stay stationary with shaft 202. Hence, in the low friction state, the shaft 202, along with first frictional element 204, can rotate relative to second frictional element 206. Therefore, when first portion 102 rotates relative to second portion 104, the second break-away torque now governs the overall break-away torque of multi-state clutch assembly 200.

Described differently, multi-state clutch assembly 200 can provide two sets of rotational elements that share the same rotational axis L. The first set can include shaft 202 and first frictional element 204 while the second set can include first frictional element 204 and second frictional element 206. Because both sets of rotational elements share the same rotational axis L, multi-state clutch assembly 200 can be turned if either one of the sets rotates. The first set of rotational elements can provide a constant first break-away torque while the second set of rotational element can provide a second break-away torque that can be changed based on the frictional state of the second frictional element 206.

When an applied torque is sufficient overcome one of the break-away torque provided by either sets, multi-state clutch assembly 200 would be turned. Hence, in the low friction state of second frictional element 206, the second set of rotational elements can become the rotational parts of multi-state clutch assembly 200. On the other hand, in the high friction state of second frictional element 206, multi-state clutch assembly 200 can switch to the first set of rotational elements because second frictional element 206 is locked with first frictional element 204.

The high friction state of second frictional element 206 can be associated with a circumstance of electronic device 100 that is stationary such as in either an open configuration or a closed configuration. As discussed, the first break-away torque can govern the overall break-away torque of multi-state clutch assembly 200 when second frictional element 206 is in the high friction state. The first break-away torque between first frictional element 204 and shaft 202 can have a predetermined value that can be sufficiently high so that first friction element 204 can have the capability to generate sufficiently high torque to counter the torque generated by the weight of some portions of electronic device 100 (e.g. the first portion). Hence, electronic device 100 can remain static equilibrium.

On the other hand, the low friction state of second frictional element 206 can be associated with a circumstance where electronic device 100 detects an imminent change of configuration such as from a closed configuration to an opened configuration. As discussed, the second break-away torque between the first and second frictional elements 204 and 206 can govern the overall break-away torque of multi-state clutch assembly when second frictional element 206 is in the low friction state. Hence, a user can easily reconfigure electronic device 100 because second frictional element 206 can freely (or almost freely) rotate with respect to first frictional element 204.

The change between the high and low friction states of second frictional element 206 can be controlled based on interface 214. Interface 214 can be a sensor, a switch, an input device, and/or other suitable components that can interact with a user or an external medium. In one case, interface 214 can be a switch for a user to toggle or press. When the switch is activated, circuitry 212 can cause second frictional element 206 to change from the high friction state to the low friction state, or vice versa. Hence, a user can activate a frictionless (or low friction) state of multi-state clutch assembly 200 by activating the switch.

In another case, interface 214 can be a sensor. A suitable sensor can be a proximity sensor capable of detecting a presence of, for example, a finger or other appendage without actually requiring a touch. For instance, a proximity sensor in the form of a temperature sensor can detect body heat. Other sensors can include optical sensors, image sensors, or touch sensors that can rely on various technologies (such as resistive, capacitive, etc.) to detect a change event.

The sensor can have various states. In the case of a touch sensor, a first state can be associated with a detection of an event corresponding to a change in a configuration of electronic device 100 (e.g. a user's skin touching the touch sensor). Otherwise the sensor can be at a second state, which can be a default state indicating a static, or no change, situation. When the sensor is in the first state, the sensor can provide a signal to circuitry 212, which in turn can cause second frictional element 206 to switch to the low friction state. When the sensor is in the second state, the sensor can provide another signal (or provide no signal at all) to circuitry 212, which in turn can cause second frictional element 206 to remain at the high friction state. As such, a user can touch the sensor to activate the low friction state of second frictional element 206 to reduce the torque of multi-state clutch assembly 200. Hence, the sensor can essentially act as a switch. In some embodiments the sensor can be visible so that users can actively control the friction of multi-state clutch assembly 200. In other embodiments the sensor can be hidden or not readily noticeable (e.g. by using same color or similar cover materials as the surrounding structure), but can be located in some likely natural locations of electronic device 100 that users often touch when users reconfigure electronic device 100. For example, those locations can be at or near the perimeter of electronic device 100. Hence, multi-state clutch assembly 200 can automatically turn to a low friction state when a user naturally touches a certain location of electronic device 100.

The use of two frictional elements can provide a fail-safe mechanism to multi-state clutch assembly 200. First frictional element 204 can always be frictional engaged with shaft 202, thus providing a generally constant break-away torque. Although in a low friction state the second frictional element 206 can provide an easier way to rotate multi-state clutch assembly 200, first frictional element 204 can still be rotated relative to shaft 202 in case when second frictional element 206 fails to release or disengage. Second frictional element 206 may fail to release or disengage, for example, when a user does not interact with interface 214, when electronic device 100 is completely powered down, or when one or more parts of the system controlling the engagement or disengagement of second frictional element 206 become defective. In any case, even if second frictional element 206 remains in the high friction state, multi-state clutch assembly 200 can still be turned using first frictional element 204 in a manner similar to a conventional clutch assembly.

Figure 4:
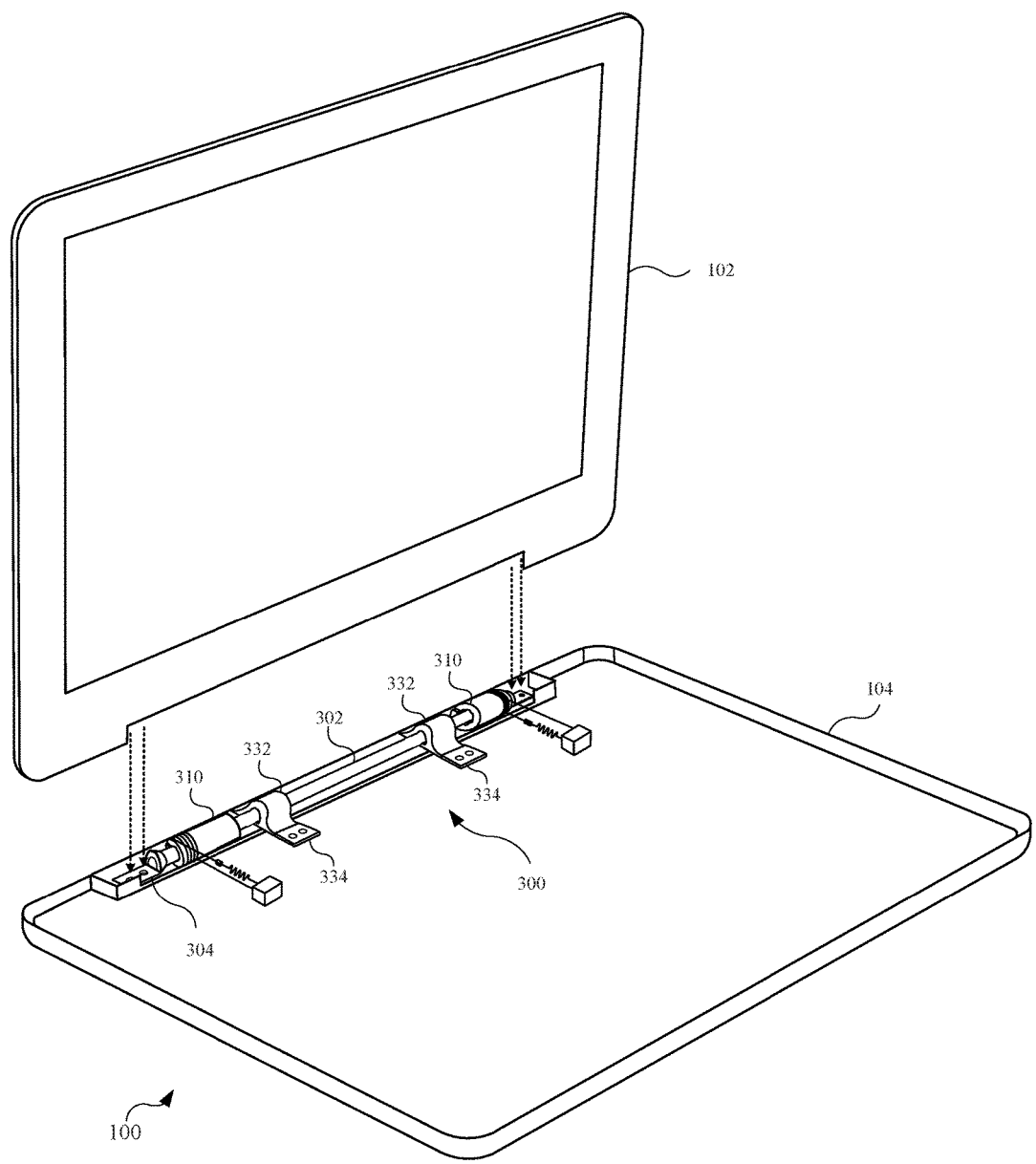
FIG. 4 is an exploded view of an electronic device including the multi-state clutch assembly shown in FIG. 3 in accordance with some embodiments.

FIG. 3 through FIG. 6 illustrates an exemplary embodiment of multi-state clutch assembly that includes the general structure described in FIG. 2. Multi-state clutch assembly 300 can include a pair of clutch systems to provide a more balanced rotation. The components in the pair can be largely the same. For each of the pair, multi-state clutch assembly 300 can include a shaft 302 that can be physically connected to a first bracket 304. Shaft 302 and first bracket 304 can have a stiff body. In some cases, shaft 302 and first bracket 304 can be integrally formed together so that both components can be parts of a single monolithic piece. First bracket 304 can have through holes 306 into which bolts (not shown) can be inserted. Hence, first bracket 304 can be mounted to first portion 102 (or second portion 104) of electronic device 100, as shown in FIG. 4. As such, shaft 302 can remain stationary with first portion 102. Along a part of or the entirety of its longitudinal axis, shaft 302 can include a cavity that is accessible at opening 308. The cavity can house electrical cables (not shown) so that first portion 102 and second portion 104 of electronic device 100 can communicate with each other through the cables.

For each of the pair of systems, it can include a clutch 310 that can take the form of a C-shaped clamp. Clutch 310 can be a first frictional element of multi-state clutch assembly 300 and can wrap around a portion of shaft 302. Clutch 310 can have a hollow and cylindrical body that can be characterized as having an exterior surface 312 and an interior surface 314. The cylindrical body can be characterized as having a longitudinal axis that is parallel to the axis of rotation (e.g. the longitudinal axis of shaft 302. The interior surface 314 can be frictionally engaged with a portion of shaft 302. The interior surface 314 can include features 316 such as multiple keys that enhances or reduces friction between clutch 310 and shaft 302 so that the exact frictional torque can be finely determined based on the shape and sizes of features 316 and the tightness of clutch 310. It should be noted that while features 316 are shown on the interior surface 314 of clutch 310, surface features could also be present on shaft 302 instead or on both shaft 302 and clutch 310. In a conventional multi-state clutch assembly, a clutch may be physically connected to a second bracket that is mounted on a second portion of the electronic device. Here, however, it should be noted that clutch 310, in some cases, is directly connected neither to first portion 102 nor to second portion 104. In other words, clutch 310 can rotate relative to first portion 102 and can also rotate relative to second portion 104.

For each of the pair of systems, a connector 320, which can serve as a second frictional element of multi-state clutch assembly 300, can wrap around clutch 310 to form a capstan system. The connector 320 can take the form of a wire, a cable, a cord, a rope or any other suitable connectors. In one embodiment, connector 320 can also be referred to as wire 320. Connector 320 can have a first end 322 that can be a fixed end that is connected to a fixed structural element 324. The fixed structural element 324 can be part of a housing of second portion 104. Connector 320 can generally be non-elastic but can have a second end 326 that is connected to an actuator 330 that can include a spring element 328. An actuator 330 can control the elongation or compression of spring element 328 to tighten or loosen connector 320.

It should be noted that the entire multi-state clutch assembly 300 can optionally be mounted on second portion 104, as shown in FIG. 4. Multi-state clutch assembly 300 can include one or more barrel 332 that encloses shaft 302 to keep multi-state clutch assembly 300 in place with second portion 104. Each barrel 332 can be connected to or integrally formed with a second bracket 334 that can be mounted on second portion 104. However, unlike clutches 310 (i.e. a frictional element), interior surfaces of barrels 332 can be well lubricated so that barrels 332 do not generate friction (or generate only insignificantly amount of friction) with shaft 302. In other words, barrels 332 may not contribute to any torque of the overall torque of multi-state clutch assembly 300. For simplicity, barrels 332 and second brackets 334 are not shown in FIG. 3.

While it is shown that first bracket 304 can be connected to first portion 102 while second bracket 334 can be connected to second portion 104, it should be understood that the arrangement could be reversed so that first bracket 304 can be connected to second portion 104 and second bracket 334 can be connected to first portion 102.

Figure 5:
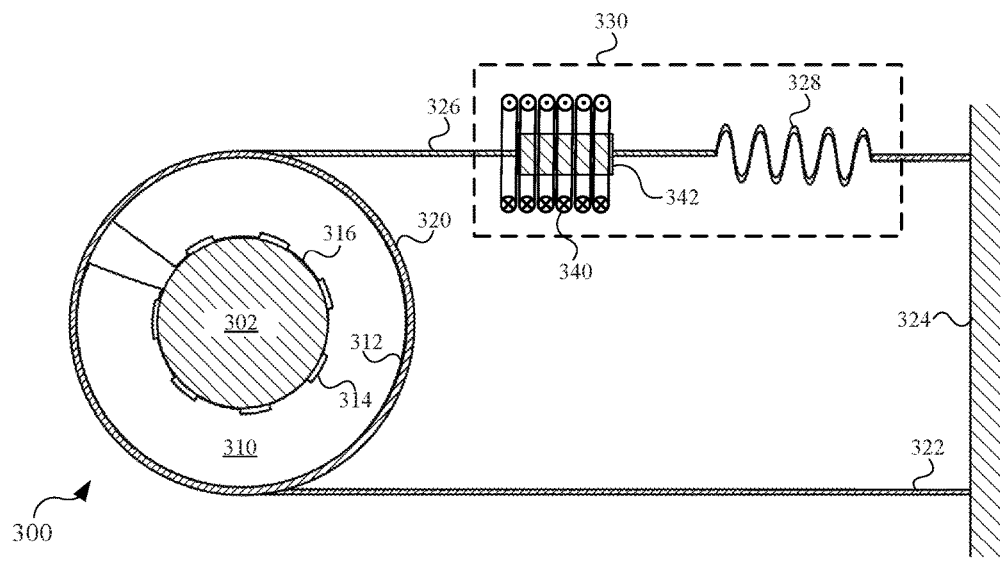
FIGS. 5 and 6 are side views of a multi-state clutch assembly in accordance with some embodiments illustrating a capstan system.
Figure 6:
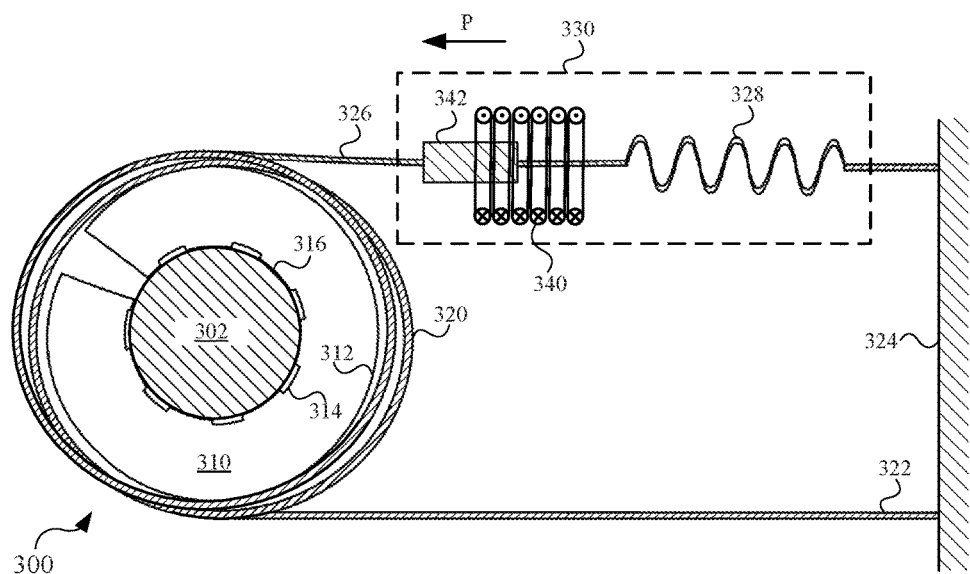

FIGS. 5 and 6 illustrate the transition between a high friction state and a low friction state of connector 320 that serves as a second frictional element of multi-state clutch assembly 300. The high friction state can be associated with a tightened state of connector 320 while the low friction state can be associated with a loosened state of connector 320. An actuator 330 can be used to control such transition. Suitable actuators can be any suitable mechanical or electromechanical components that provide a corresponding output based on an input. An exemplary input can be an electrical signal and an exemplary output can be a mechanical action. Mechanical actions can take various forms of forces, torques, or motions that can maintain, move, or alter the positions and/or configurations of one or more components in multi-state clutch assembly 300, depending on the exact configuration of multi-state clutch assembly 300.

For example, in one embodiment, actuator 330 can provide a mechanical action in the form of a pushing force or a pulling force that can respectively loosen or tighten connector 320 based on an electrical signal received by actuator 330. As shown in FIGS. 5 and 6, actuator 330 can include a transistor (not shown), a coil 340 in communication with the transistor, and a magnetic element 342 surrounded by coil 340, and spring element 328. Spring element 328 in actuator 330 can be in its equilibrium length when connector 320 is retracted and tightened against clutch 310, as shown in FIG. 5. At this stage, actuator 330 can provide a first mechanical action in the form of a pulling force that is provided by the spring force of spring element 328. At the stage shown in FIG. 6, the transistor can receive an input signal from a processor or directly from a sensor. Coil 340 can be in communication with the transistor and can be energized by the transistor based on the input signal. When energized, coil 340 can form a magnetic circuit with magnetic element 342 that pushes magnetic element 342 towards clutch 310 as indicated by the arrow P. Put differently, in response to an input signal, actuator 330 can provide a second mechanical action in the form of a pushing force that can overcome the natural spring force of spring element 328 so that spring element 328 can be extended and magnetic element 342 can be pushed towards clutch 310. Since magnetic element 342 is connected to second end 326 of connector 320, second end 326 of connector 320 is also moved toward clutch 310. Because connector 320 is fixed at first end 322, the pushing of second end 326 towards clutch 310 can loosen and unwind connector 320, as shown in FIG. 6. Hence, actuator 330 can control the tightening or loosening of connector 320. The inputs that can control actuator 330 can be received using a component of actuator 330 (e.g. the transistor) that can be connected to circuitry such as circuitry 212 shown in FIG. 2 or to any sensors described herein. While one example of actuator 330 using a coil is described, those skilled in the art would understand actuator 330 could be any suitable mechanical or electromechanical component.

In short, in a first state when coil 340 is not energized, actuator 330 can exert a first force on connector 320 that can be equal to the natural spring force of spring element 328 in an equilibrium position. In a second state when coil 340 is energized, the magnetic circuit formed between coil 340 and magnetic element 342 can counter the spring force so that actuator 330 can exert a second force (which can be zero) on connector 320 that is weaker than the first force.

Alternatively, in another embodiment, spring element 328 can be in its equilibrium length when connector 320 is loosened. When actuator 330 is activated, it can exert a force to compress spring element 328. As a result, second end 326 of connector 320 can be moved away from clutch 310 and tighten the connector 320.

The use of the winding of connector 320 can amplify a small force to control the torque between connector 320 and clutch 310. Connector 320 can be wound around clutch 310 several turns (e.g. 3 or 5 turns or even fewer turns in case of a high coefficient of friction between connector 320 and clutch 310). According to the Capstan Equation below, which is also known as the Belt Friction Equation, the torque between connector 320 and clutch 310 can increase exponentially when the number of turns increases. In Equation (1), F can be the applied force, T can be the resulting torque, $\mu$ can be the coefficient of friction between connector 320 and clutch 310, and $\phi$ can be the total angle swept by all turns of connector 320 with one full turn equal to $2\pi$.

$$T \propto F e^{\mu \phi} \quad \text{Eq (1)}.$$

For example, a four-turn winding can provide a torque that is ten to even thousand times of the torque of a single-turn winding, with the exact multiplier value depending on the coefficient of friction between connector 320 and clutch 310. For example, for a coefficient of friction of 0.3, a four full turns of winding will result in an amplification of torque of about 1800 times. When connector 320 is loose, effectively there is no turn of winding because there can be no contact or a rather insignificant residual contact between connector 320 and clutch 310. Explained differently, the coefficient of friction between connector 320 and clutch 310 is very low because connector 320 is loose. Hence, the break-away torque between connector 320 and clutch 310 is very small or even at a null value in a loosened state so that connector 320 can fully slid or on the verge of fully sliding relative to clutch 310. A null value can be a zero torque value. In other words, an applied torque can easily overcome the break-away limit between connector 320 and clutch 310 to rotate clutch 310 relative to connector 320. In contrast, the tightening of connector 320 can result in several turns of winding. Hence, the break-away torque between connector 320 and clutch 310 can be exponentially increased. According to the Equation (1), the torque in a tightened state can be ten to even thousand times (in case of a high coefficient of friction) stronger than the force that holds connector 320 (i.e. tightening the wire). Hence, by using a relatively small spring element 328 that can generate a small force, a large amount of torque can be generated in a tightened state. Accordingly, connector 320 and clutch 310 can have a very high break-away torque limit in the tightened state. Moreover, a small actuator 330 can be sufficient to overcome the spring force of spring element 328 to turn connector 320 from the tightened state to the loosened state. The large amount of torque provided in the tightened state can essentially lock clutch 310 in place with connector 320. An applied torque to turn multi-state clutch assembly 300 will turn shaft 302 relative to clutch 310.

Because the torque provided by connector 320 can vary from a first value to a second value that is at least ten times of the first value, connector 320 can serve well as a second frictional element of multi-state clutch assembly 300. In the loosened state, the friction between connector 320 and clutch 310 can be very low. At the same time, clutch 310 can have a stiff body so the friction between clutch 310 and shaft 302 can be constant, which can be significantly higher than the friction generated by the loose connector 320. Hence, clutch 310 and shaft 302 can remain stationary relative to each other while clutch 310 can slide relative to loose connector 320. In other words, when first portion 102 of electronic device 100 rotates relative to second portion 104, clutch 310 and shaft 302 can move together relative to the loose connector 320.

On the contrary, in the tightened state, the friction between connector 320 and clutch 310 can increase exponentially and can far exceed the fixed predetermined range of friction between clutch 310 and shaft 302. Due to the high friction, connector 320 can be locked in place with clutch 310. Hence, clutch 310 can no longer rotate relative to connector 320. However, multi-state clutch assembly 300 can still be turned because shaft 302 can still rotate relative to clutch 310. In other words, when first portion 102 of electronic device 100 rotates relative to second portion 104, shaft 302 can move relative to clutch 310 that remains stationary with tightened connector 320.

The use of a capstan system as a second frictional element of multi-state clutch assembly 300 can provide flexibility in manufacture in terms of tolerance. Because there can be a significant exponential difference in torques between the tightened state and the loosened state of connector 320, the exact amounts of force provided by spring element 328 and/or by actuator 330 do not have to be precise. Multi-state clutch assembly 300 can work properly as long as the break-away torque of connector 320 is lower than the break-away torque between clutch 310 and shaft 302 in the loosened state and the break-away torque of connector 320 is higher than the break-away torque between clutch 310 and shaft 302 in the tightened state. It is not difficult to achieve the result using a capstan system because the friction of connector 320 can increase exponentially from a loosened state to a tightened state. Hence, the range of the amount of force provided by spring element 328 and/or actuator 330 can be less precise in achieving such result. In other words, the manufacturing cost of multi-state clutch assembly 300 can be reduced.

The use of multi-state clutch assembly 300 can also reduce the vibration (e.g. swinging back and forth) of first portion 102 of electronic device 100 relative to second portion 104. When a first portion of an electronic device using a conventional multi-state clutch assembly rotates relative to a second portion, the first portion often swings slightly back and forth before it comes to a full stop because the clutch force may cause bending of the first portion slightly. The first portion may carry a display assembly. This type of vibration may momentarily deteriorate the quality of the display and/or cause fuzziness in the display. On the contrary, first portion 102 can smoothly turn relative to second portion 104 when the low friction state of connector 320 is activated. The vibration can be significantly reduced or completely eliminated because the frictionless movement of multi-state clutch assembly 300 will not bend first portion 102 or store energy in the bending of first portion 102 that causes the vibration.

Referring back to FIG. 3, multi-state clutch assembly 300 can have a pair of clutches 310 and a pair of capstan systems 336 and 338. This arrangement can provide a more balanced hinge system. In addition, the torque provided by a connector 320 in a capstan system can be unidirectional, meaning that, even in the tightened state, connector 320 may only provide torque in a single rotational direction but not the opposite rotational direction. In the opposite rotational direction, clutch 310 may slide relative to connector 320 even though connector 320 is in the tightened state. It is because connector 320 can have spring element 328 at one end. Hence, for example, for capstan system 336, connector 320 can only provide torque in the rotational direction R2 because spring element 328 pull connector 320 in the direction opposite to rotational direction R2. Yet, in the rotational direction R3 that is opposite rotational direction R2, spring element 328 in capstan system 336 can no longer act against the rotational force so that clutch 310 will slide relative to connector 320 and no torque is generated. Because of the unidirectional nature of the capstan systems, the pair of capstan systems 336 and 338 can be arranged in an opposite manner. In other words, connectors 320 can be wound in opposite directions (e.g. clockwise and counter-clockwise) in capstan systems 336 and 338. As such, in capstan system 336, first end (lower end) 322 can be connected to a fixed structural element 324 and second end (upper end) 326 can be connected to spring element 328. In capstan system 338, first end (lower end) 326 can be connected to spring element 328 and second end (upper end) 322 can be connected to fixed structural element 324.

In one case, both connectors 320 in capstan systems 336 and 338 can tighten or loosen in a synchronized manner, meaning both connectors 320 can be tightened at the same time or be loosened at the same time. When both connectors 320 are tightened, connector 320 in capstan system 336 can act as the second frictional element for multi-state clutch assembly 300 in rotational direction R2 while connector 320 in capstan system 338 can act as the second frictional element for multi-state clutch assembly 300 in rotational direction R3. When both connectors 320 are loosened, there is no (or very low) friction between any clutches 310 and any connectors 320. Hence, the two clutches 310 locked in place with shaft 302 can together rotate relative to both connectors 320.

In another case, one connector 320 can be tightened while another connector 320 can be loosened. This can provide a frictionless rotation of multi-state clutch assembly 300 in one direction but not another direction. For example, when connector 320 in capstan system 336 is loosened while connector 320 in capstan system 338 is tightened, multi-state clutch assembly 300 can provide frictionless turning only in direction R4. In some cases, direction R2 can be associated with the opening of electronic device 100. In other words, in a situation where connector 320 in capstan system 336 is loosened while connector 320 in capstan system 338 is tightened, multi-state clutch assembly 300 can only allow a frictionless reconfiguration of electronic device 100 from a closed configuration to an open configuration, but not the opposite direction. This unidirectional frictionless configuration can allow users to effortlessly open electronic device 100 while prevent first portion 102 from naturally falling back to second portion 104.

Figure 7:
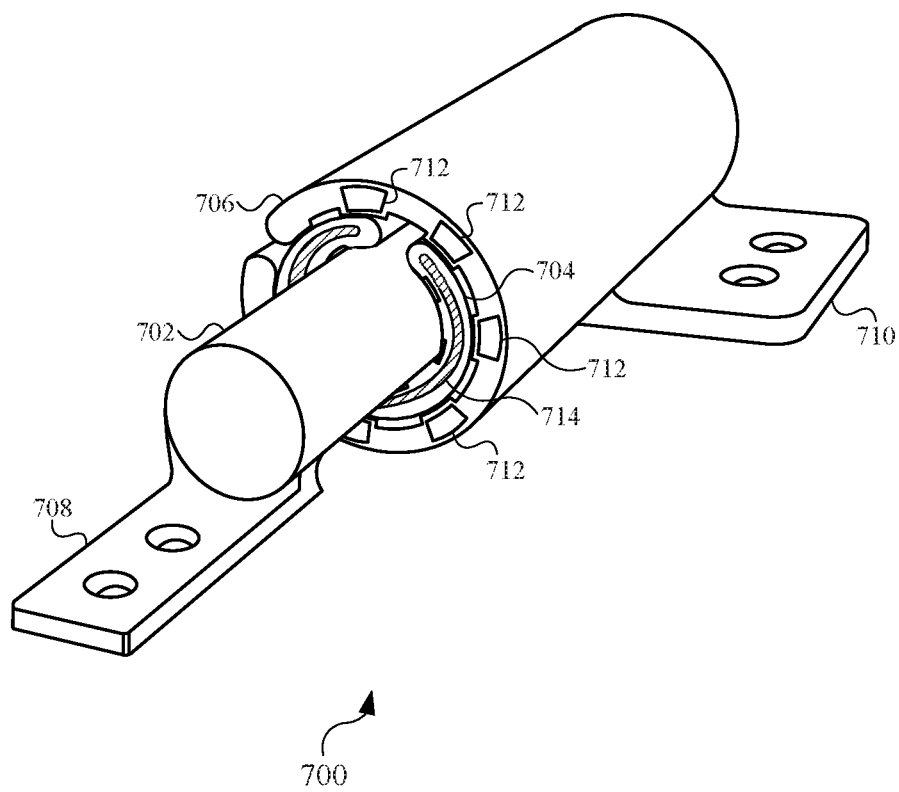
FIG. 7 is another exemplary multi-state clutch assembly in accordance with some embodiments.

FIG. 7 illustrates another exemplary embodiment of clutch assemblies that have the general structure described in FIG. 2. In FIG. 7, multi-state clutch assembly 700 can include a shaft 702, a first clutch 704 as a first frictional element that can be frictionally engaged with shaft 702, and a second clutch 706 as a second frictional element that can be frictionally engaged with first clutch 704. Shaft 702 can be physically connected to or integrally formed with first bracket 708 that can be connected to a first portion of an electronic device. Second clutch 706 can be physically connected to or integrally formed with second bracket 710 that can be mounted on a second portion of an electronic device. In its natural state, second clutch 706 can be in a tightened state that exerts a friction on first clutch 704 that can be higher than the friction between first clutch 704 and shaft 702. Second clutch 706 can include one or more electromagnets 712. The electromagnets 712 that can form magnetic circuit with the magnetic element 714 carried by first clutch 704. When the magnetic circuit is formed, a strong repulsive force can be generated to push second clutch 706 slightly away from first clutch 704. In other words, second clutch 706 can become less tightened on first clutch 704, thereby reducing the friction between the first and second clutch 706. Hence, the activation of the electromagnets 712 can turn second clutch 706 into a low friction state. In one case, second clutch 706 can be fully disengaged from first clutch 704 due to the repulsive force. An effortless turn of multi-state clutch assembly 700 can be achieved. Electromagnets 712 can be controlled and activated by circuitry of electronic device 100 such as circuitry 212 as shown in FIG. 2 based on interface 214.

In yet another embodiment, a multi-state clutch assembly can include a shaft, a clutch as a first frictional element that can be frictionally engaged with shaft, and a wedge as a second frictional element that can be slid to engage or disengage clutch to lock or unlock clutch. The wedge can slide in and completely stop the relatively rotation because the clutch and the wedge. When the wedge is engaged with the clutch, the multi-state clutch assembly can still be turned through the relative rotation between the clutch and the shaft. The movement of the wedge can be controlled by electromagnets that attach or repel magnetic elements in the wedge or by any other suitable well-known mechanisms.

Figure 8A:
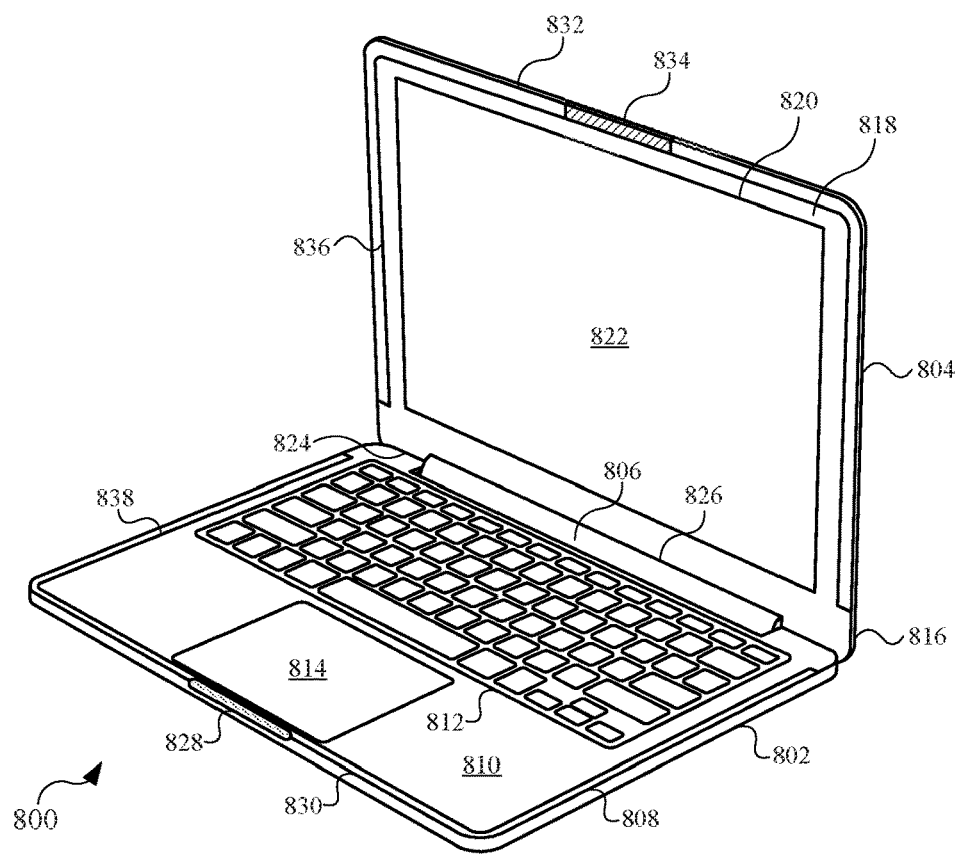
FIGS. 8A and 8B illustrate an exemplary electronic device in accordance with some embodiments.
Figure 8B:
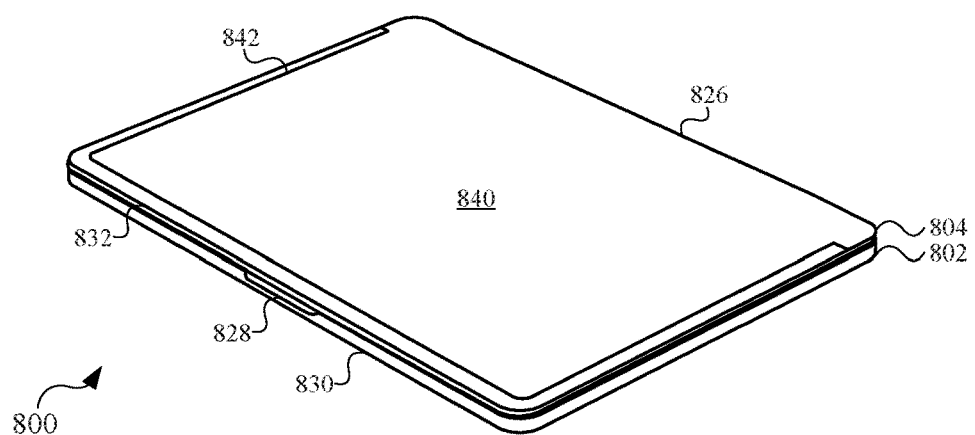

FIGS. 8A and 8B respectively illustrate an exemplary laptop computer 800 in an open configuration and in a closed configuration. The laptop computer 800 can include a first portion such as base portion 802 and a second portion such as a lid portion 804 that can be pivotally coupled to base portion 802 through multi-state clutch assembly 806. Multi-state clutch assembly 806 can have the structure of any clutch assemblies described herein. The base portion 802 can include a housing 808 that carries various integrated circuit chips and other circuitry (not shown) that provide computing operations for laptop computer 800. For example, the integrated circuit chips and other circuitry may include a motherboard, microprocessors, read-only memory, random-access memory, hard drives, batteries, and various input/output support devices. On top surface 810 of housing 808, there can be various user input devices such as a keyboard 812 and a trackpad 814 that are electrically coupled to the internal circuitry for users to control laptop computer 800. The housing 808 of the base portion 802 can be formed from a metal, such as aluminum or an alloy that includes aluminum. However, other materials are possible, such as a rigid plastic or ceramic.

Lid portion 804 of laptop computer 800 can include a housing 816, a bezel 818, and a display assembly 820. Housing 816 and bezel 818 can cooperate to form a cavity that carries display assembly 820. An outer protective cover made from a transparent material, such as glass or sapphire, can overlay display assembly 820. Housing 816 and the bezel 818 can be formed from the same material as the housing 808 of the base portion 802 to give a coherent and aesthetic appearance to the laptop computer 800. In one case, lid portion 804 can have a front surface 822 that can be generally in the same size and shape as top surface 810 of base portion 802.

Laptop computer 800 can include one or more sensors, switches, input devices, and/or any suitable interfaces (e.g. interface 214 as shown in FIG. 2) that can be used for the control of the break-away torque limit of the multi-state clutch assembly 806. Multi-state clutch assembly 806 can be located at or along a first edge 824 of base portion 802 to connect a first edge 826 of lid portion 804. Both first edges 824 and 826 can sometimes also be referred to rear edges. A recessed area 828 can be located at a second edge 830 of base portion 802 that opposites first edge 824. Second edge 830 can sometimes also be referred to a front edge. Although it is being shown at the base portion 802, recessed area 828 can also be located at a second edge 832 of lid portion 804 that opposites first edge 826. In one case, base and lid portions 802 and 804 can both have a recessed area. The recessed area 828 can provide a slot when laptop computer 800 is in a closed configuration (shown in FIG. 8B). The slot can allow users to conveniently put fingers there to apply force to open laptop computer 800. Hence, the area at and around recessed area 828 is one of the natural and likely locations that users will touch when they intend to change the configuration of laptop computer 800. Laptop computer 800 can include a sensor 834 or a switch at second edge 832 of lid portion 804 corresponding to the location of recessed area 828 at base portion 802. The sensor 834 or switch can also cover the area of bezel 818 that is above display assembly 820 and below second edge 832. The sensor 834 or switch can detect a change event or receive a user command that is associated with reducing the friction of multi-state clutch assembly 806. In one case, the sensor 834 can be a capacitive touch sensor that can detect the touch event of fingers of users. Hence, when a user puts his/her hand at the recessed area 828, the detection of the change event can signify to laptop computer 800 that the user intends to open laptop computer 800. In turn, a processor in laptop computer 800 can cause multi-state clutch assembly 806 to reduce its break-away torque so that the user can easily open laptop computer 800.

The location of sensor 834 at the front edge of lid portion 804 is merely an exemplary suitable location. Alternatively or additionally, other sensors and/or switches can be located at any suitable locations of laptop computer 800. For example, touch sensors can be located along or near both side edges and front edge of surface 822 of lid portion 804 and surface 810 of base portion 802, as indicated by elements 836 and 838. In one case, the sensor can extend along at least two sides of a perimeter. Additional sensors can also be located along or near the side edges and front edge of back surface 840 of lid portion 804, as indicated by element 842 in FIG. 8B.

Figure 9:
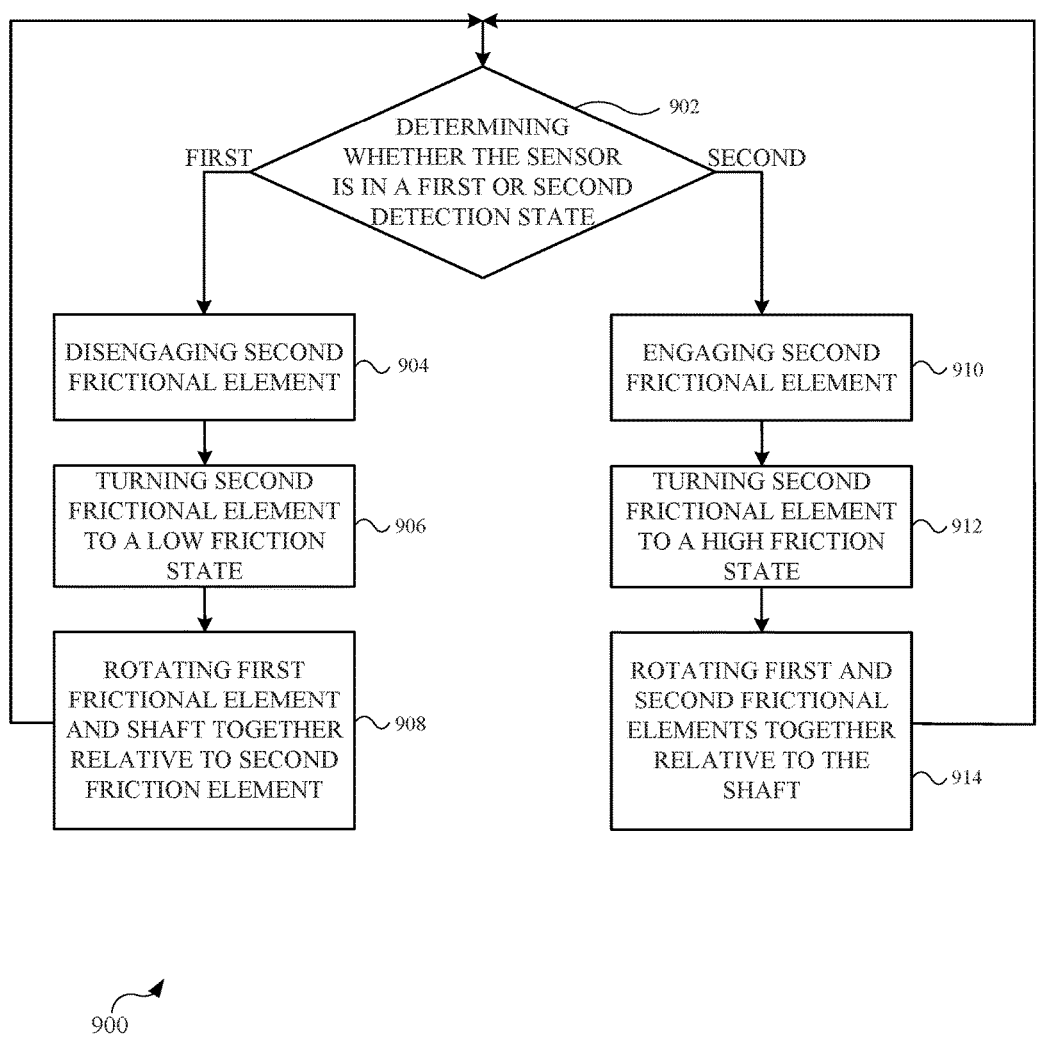
FIG. 9 a flowchart depicting a method for controlling the break-away torques provided by a multi-state clutch assembly in accordance with some embodiments.

FIG. 9 illustrates a flowchart depicting a method 900 for controlling the break-away torque of a multi-state clutch assembly of an electronic device in accordance with some embodiments. The multi-state clutch assembly can be multi-state clutch assembly 200 that can include a shaft, a first frictional element, and a second frictional element. Method 900 can begin at step 902, which can be a decision state that determines whether a sensor is at a first detection state or a second detection state. For example, a first detection state can be associated with a detection of a change event otherwise the sensor can be at a second detection state. It should be noted that the sensor could be replaced with a switch, an input device, and/or any other suitable interfaces. If the sensor is at a first detection state, at step 904 a second frictional element of the multi-state clutch assembly can be disengaged from the first frictional element. Hence, at step 906, the second frictional element can be turned to a low friction state. As a result, at step 908, the first frictional element and the shaft can be rotatable together relative to the second frictional element. At this stage, the break-away torque between the first and second frictional elements can govern the overall break-away torque of the multi-state clutch assembly. After step 908, the method 900 can return to decision stage 902 to continuously determine whether the sensor is at a first or second detection state. If the sensor is in a second detection state, at step 910, the second frictional element of the multi-state clutch assembly can engage with the first frictional element. Hence, at step 912, the second frictional element can be turned to a high friction state. As a result, at step 914, the first and second frictional elements can be rotatable together relative to the shaft. At this stage, the break-away torque between the first frictional element and the shaft can govern the overall break-away torque of the multi-state clutch assembly.

Figure 10:
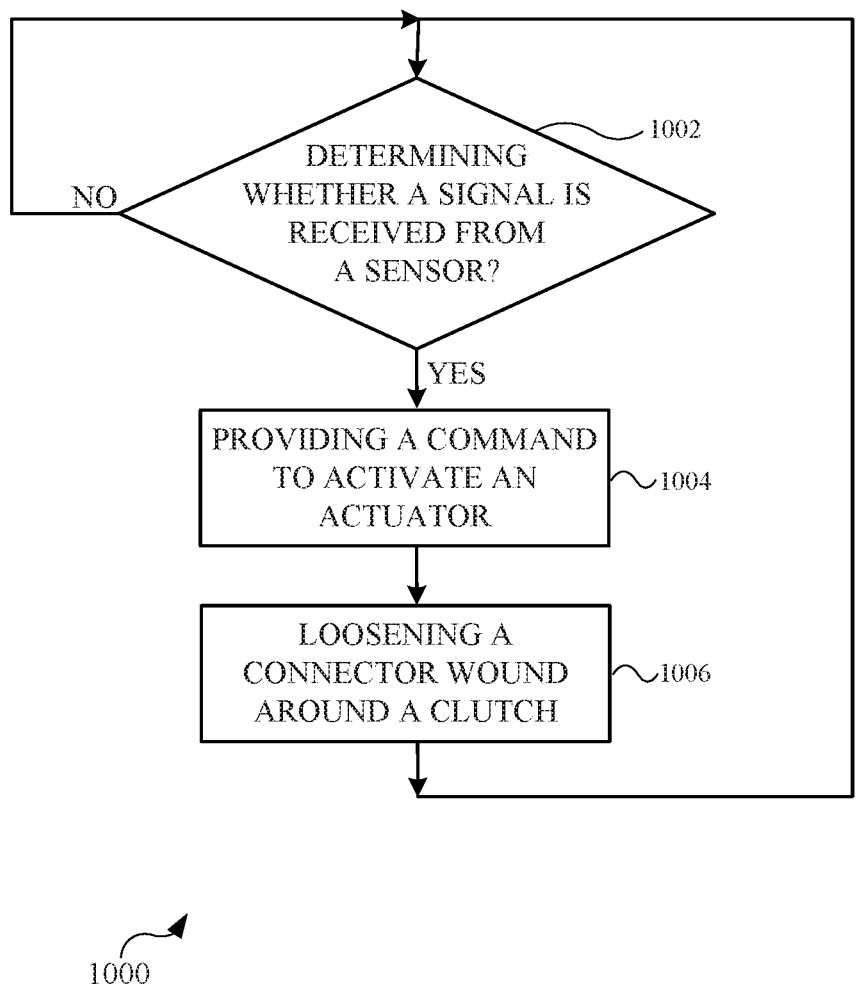
FIG. 10 is a flowchart depicting a method for controlling the break-away torque of a multi-state clutch assembly that can include a capstan system in accordance with some embodiments.

FIG. 10 illustrates a flowchart depicting a method 1000 for controlling a multi-state clutch assembly that includes a capstan system in accordance with some embodiments. For example, the multi-state clutch assembly can be multi-state clutch assembly 300 described in FIGS. 3-6. The connector of the capstan system can be connected to an actuator that can exert a force on the connector. The capstan system can amplify the force to generate a torque. At its natural state, the connector of the capstan system can be tightened against a clutch because the actuator can include a spring element that naturally exerts a spring force on the connector. Method 1000 can begin when a processor of an electronic device continuously awaits a signal from a sensor. At decision stage 1002, the processor can determine whether signals are received from a sensor. The sensor can also be replaced with a switch or any other suitable interface. The sensor can transmit a signal when the sensor is activated. In one case, a touch sensor can be activated by a change event. If the processor does not receive the signal, the processor can continue to await the signal. If a signal is received, at step 1004 the processor can provide a command to activate the actuator. The actuator can include a transistor that controls the activation of the actuator. When the actuator is activated, at step 1006 the actuator can exert a force to counter the spring force and, in turn, loosen the spring loaded capstan system. As a result, the connector wound around a clutch can be loosened. If the actuator is not activated, the capstan system can naturally return to the tightened state. After step 1006, method 1000 can return to decision stage 1002, where the processor can continue to await for any signals from the sensor.

Figure 11:
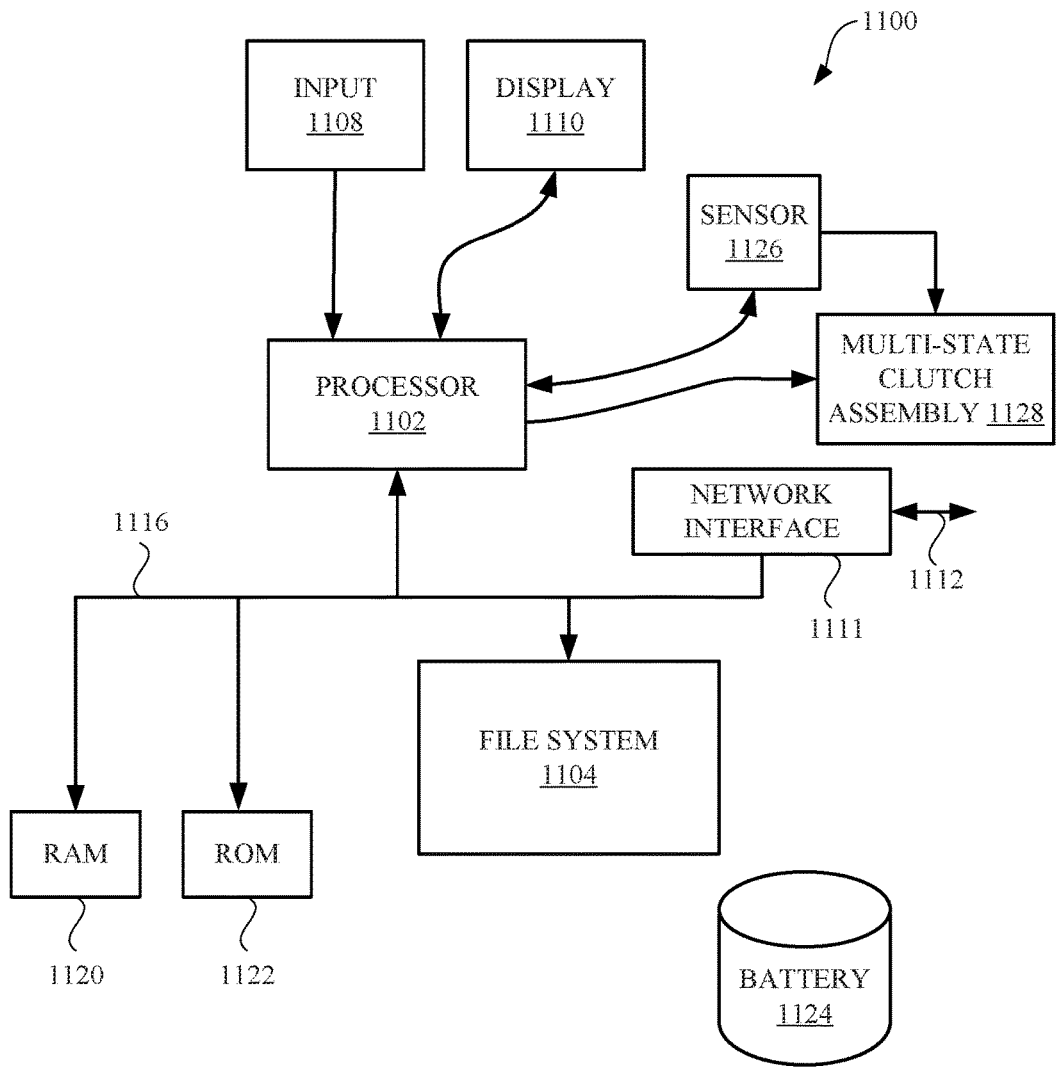
FIG. 11 is a block diagram of an electronic device in accordance with some embodiments.

FIG. 11 is a block diagram that illustrates circuitry of an electronic device 1100 in accordance with some embodiments. The electronic device 1100 can be any electronic device or system described herein, including electronic device 100, laptop computer 800 and/or any other suitable electronic devices or systems. An exemplary electronic device can contain all or some of the components shown in FIG. 11. The electronic device 1100 can include a processor 1102 that pertains to a microprocessor or controller for controlling the overall operation of the electronic device 1100. The electronic device 1100 can store data in a file system 1104. The file system 1104 can be, typically, a storage disk or a plurality of disks. The file system 1104 typically can provide high capacity storage capability for the electronic device 1100. The electronic device 1100 can also include a RAM 1120 and a Read-Only Memory (ROM) 1122. The ROM 1122 can store non-transitory computer readable mediums, programs, utilities or processes to be executed in a non-volatile manner. The RAM 1120 provides volatile data storage.

The electronic device 1100 can also include a user input device 1108 that allows a user of the electronic device 1100 to interact with the electronic device 1100. For example, the user input device 1108 can take a variety of forms, such as a button, keypad, touch screen, audio input interface, visual/image capture input interface, input in the form of sensor, data, etc. Still further, the electronic device 1100 can include a display 1110 (screen display) that can be controlled by the processor 1102 to display information to the user. A data bus 1116 can facilitate data transfer between at least the file system 1104 and the processor 1102.

Sensor 1126 can take the form of circuitry for detecting any number of stimuli. For example, sensor 1126 can include a touch sensor or pressure sensor that detects a change event, an audio sensor, a light sensor such as a photometer, and so on. Sensor 1126 can be in communication with processor 1102. Multi-state clutch assembly 1128 can include one or more actuators that can include transistors that are in communication with processor 1102. In one embodiment, sensor 1126 can be in direct communication with a transistor of multi-state clutch assembly 1128. For example, sensor 1126 can provide a voltage that controls the transistor. When the transistor receives the voltage, it can amplify the voltage and energize a coil of an actuator in multi-state clutch assembly 1128.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A clutch assembly that pivotally couples a first portion and a second portion of an electronic device, the clutch assembly providing an overall break-away torque, the clutch assembly comprising:
    a rotatable component capable of rotating about a rotational axis;
    a torque generating system engaged with the rotatable component, the torque generating system comprising (i) a first torque component in contact with the rotatable component and capable of providing a first break-away torque having a fixed value, and (ii) a second torque component capable of providing a second break-away torque having a variable value; and
    an actuator in communication with the second torque component, the actuator capable of providing a mechanical action that alters a friction state of the second torque component such that the second break-away torque varies in accordance with the mechanical action,
    wherein the overall break-away torque is (i) the variable value when the variable value is less than the fixed value, otherwise, (ii) the fixed value.

2. The clutch assembly as recited in claim 1, wherein the first torque component comprises a cylindrical body characterized as having a longitudinal axis that is coaxial to the rotational axis.

3. The clutch assembly as recited in claim 1, wherein the second torque component comprises a connector connecting the actuator and the first torque component.

4. The clutch assembly as recited in claim 3, wherein the connector is a wire wrapping around an exterior surface of the first torque component.

5. The clutch assembly as recited in claim 3, wherein the actuator comprises a spring element that exerts a spring force on the connector, and when the actuator receives an input, the actuator reduces the spring force exerted on the connector.

6. The clutch assembly as recited in claim 1, wherein, when the mechanical action causes the second torque component to disengage from the first torque component, the second break-away torque has a null value.

7. The clutch assembly as recited in claim 1, wherein the second break-away torque is amplified in accordance with a force provided by the actuator.

8. A clutch assembly capable of pivotally coupling a first portion of an electronic device to a second portion of the electronic device, the clutch assembly comprising:

a shaft;

a first torque component rotationally engaged with the shaft, the first torque component having a hollow body characterized as having an exterior surface and an interior surface, the interior surface frictionally engaged with the shaft, the first torque component providing a first break-away torque having a fixed value; and a second torque component that is adjustable, the second torque component providing a second break-away torque having a variable value, wherein in an engaged state of the second torque component, the second torque component is frictionally engaged with the exterior surface of the first torque component such that the variable value is greater than the fixed value, and wherein in a disengaged state of the second torque component, the variable value is less than the fixed value.

9. The clutch assembly as recited in claim 8, wherein in the engaged state, the second torque component is stationary relative to the first torque component, and the first and second torque components are rotatable relative to the shaft.

10. The clutch assembly as recited in claim 8, wherein in the disengaged state, the first torque component is stationary relative to the shaft and the second torque component is rotatable relative to the first torque component.

11. The clutch assembly as recited in claim 8, wherein an engagement or disengagement of the second torque component is based on a detection state of a sensor.

12. The clutch assembly as recited in claim 11, wherein the detection state is associated with the engaged state of the second torque component.

13. The clutch assembly as recited in claim 12, wherein the detection state is associated with the disengaged state of the second torque component.

14. The clutch assembly as recited in claim 11, wherein the sensor is located near an edge of a lid portion of the electronic device, and the lid portion carries a display assembly.

15. The clutch assembly as recited in claim 11, wherein the sensor extends along at least two sides of a perimeter of the first portion of the electronic device.

16. A method for operating a clutch assembly that pivotally couples a lid portion to a base portion of a laptop computer, the laptop computer having (i) a sensor, and (ii) the clutch assembly that includes a shaft, a first torque component providing a first break-away torque having a fixed value, and a second torque component providing a second break-away torque having a variable value, the method comprising:

receiving, from the sensor, a detection signal associated with a detection state of the sensor;

in response to determining that the detection signal is associated with a first detection state in which the first torque component is engaged with the second torque component:

causing the second torque component to provide the second break-away torque having the variable value that is greater than the fixed value; and otherwise, in response to determining that the detection signal is associated with a second detection state in which the first torque component is disengaged from the second torque component:

causing the second torque component to provide the second break-away torque having the variable value that is less than the fixed value.

17. The method as recited in claim 16, wherein an overall break-away torque is (i) the variable value when the variable value is less than the fixed value, otherwise, (ii) the fixed value.

18. The method as recited in claim 16, wherein, when mechanical action causes the second torque component to disengage from the first torque component, the first break-away torque has a null value.

19. The method as recited in claim 16, wherein the second torque component comprises a connector connecting an actuator to the first torque component.

20. The method as recited in claim 16, wherein the first torque component comprises a cylindrical body.

* * * * *